United States Patent [19]

Flaxman

[11] Patent Number: 4,750,504
[45] Date of Patent: Jun. 14, 1988

[54] VEHICLE WASHING APPARATUS

[75] Inventor: Michael Flaxman, Huntington Station, N.Y.

[73] Assignee: Hercules Car Wash International, Huntington, N.Y.

[21] Appl. No.: 910,879

[22] Filed: Sep. 24, 1986

[51] Int. Cl.$^4$ .............................................. B08B 3/02
[52] U.S. Cl. ...................................... 134/123; 134/172
[58] Field of Search .................. 134/45, 123, 172, 174; 15/DIG. 2

[56] References Cited

U.S. PATENT DOCUMENTS

| | | | |
|---|---|---|---|
| 2,583,703 | 1/1952 | Morison | 134/123 X |
| 2,689,577 | 9/1954 | Dunn et al. | 134/123 |
| 3,088,472 | 5/1963 | Haines | 134/123 X |
| 3,102,545 | 9/1963 | Knight, Jr. et al. | 134/45 |
| 3,258,019 | 6/1966 | Bellas et al. | 134/123 X |
| 3,351,076 | 11/1967 | Haines | 134/123 X |
| 3,612,075 | 10/1971 | Cook | 134/123 X |
| 4,303,087 | 12/1981 | Flaxman | 134/123 X |

FOREIGN PATENT DOCUMENTS 2439067 6/1975 Fed. Rep. of Germany ...... 134/123

Primary Examiner—Harvey C. Hornsby
Assistant Examiner—Frankie L. Stinson
Attorney, Agent, or Firm—Roberts, Spiecens & Cohen

[57] ABSTRACT

A vehicle washing apparatus is provided in which two U-shaped frames suspend a rectangular frame in an overhead arrangement. In the rectangular frame is supported a piston and cylinder arrangement which controls the playing out of four lines which are guided by pulleys to a vertical attitude suspending an open frame adapted for being lowered and raised. In lowered position, the frame encircles a vehicle and sprays the same with water and a cleaning fluid. For this purpose, the frame is provided with inwardly directed nozzles which are accommodated in a channel provided in the open frame. The water and cleaning fluid are stored in two tanks connected to two pumps which are connected by two lines to the open frame and the nozzles therein. The piston and cylinder arrangement is operated by compressed air.

12 Claims, 3 Drawing Sheets

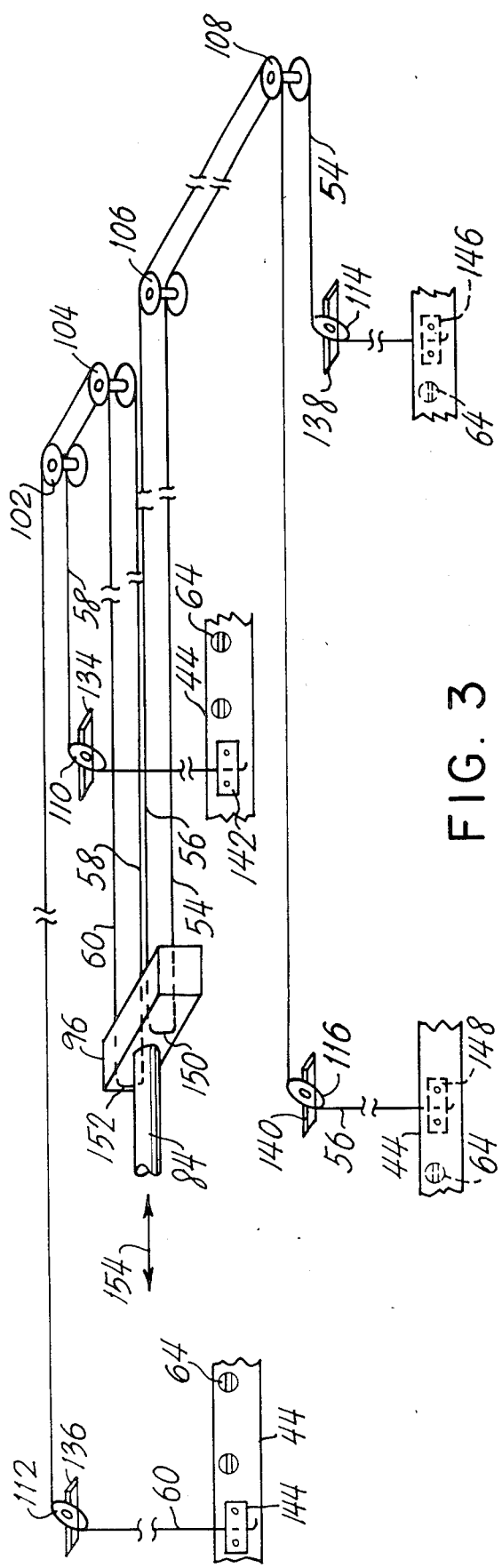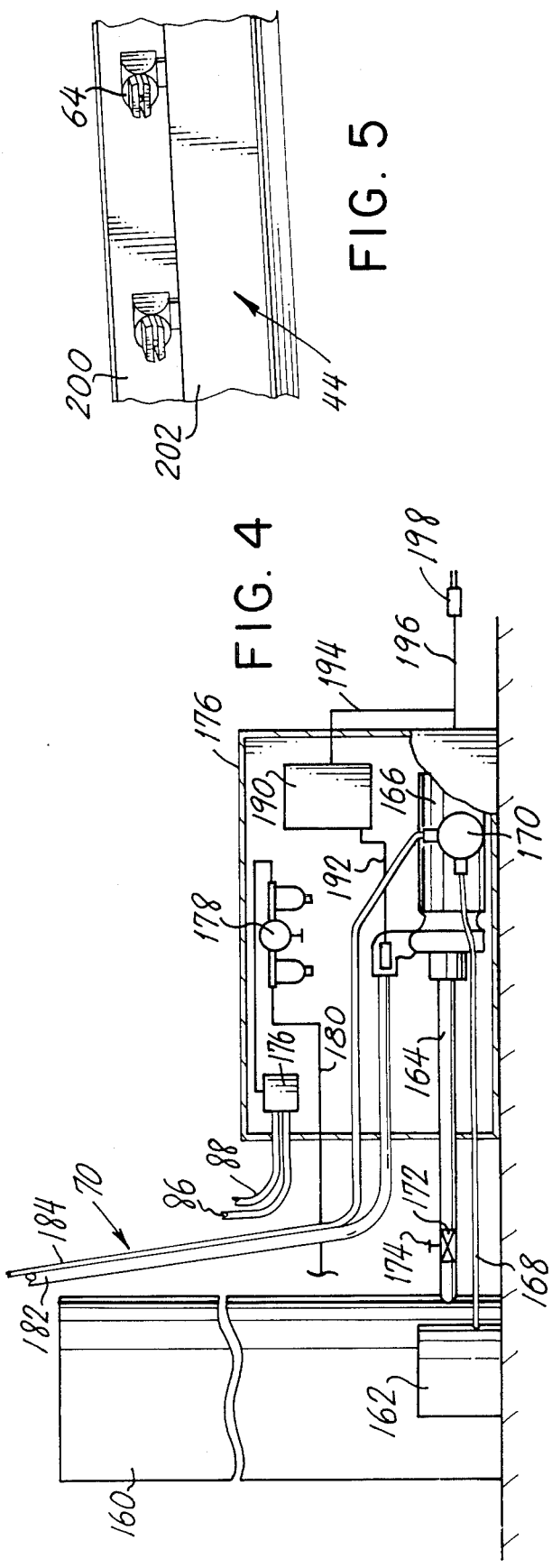

VEHICLE WASHING APPARATUS

FIELD OF INVENTION

This invention relates to cleaning apparatus and more particularly to apparatus for washing vehicles such as by the application of water and soap.

BACKGROUND

Various sophisticated types of carwashing apparatus are available in which the vehicle being washed is contacted by various moving mechanisms such as brushes and the like and in which the vehicle is contacted by various sensing mechanisms which direct the application of washing fluids or wax or the like. These sensing mechanisms also direct the application of various types of brushes to the vehicle being washed or in the alternative may direct the application of rollers or flapping strips of cloth.

SUMMARY OF INVENTION

It is an object of the invention to provide a novel type of vehicle washing apparatus in which the vehicle being washed is not contacted by moving mechanisms while nevertheless affording an effective and efficient technique for the washing of vehicles.

It is another object of the invention to provide an improved carwashing apparatus which is especially suited for reducing new car preparation time.

Yet another object of the invention is to provide an improved vehicle washing apparatus which provides for avoiding the types of damage that can be caused by brush systems such as broken antennae and the leaving of swirl marks on the finish of new and used vehicles.

It is still another object of the invention to provide an improved carwash system which avoids damaging moldings and/or trim.

Yet another object of the invention is to provide a relatively maintenance-free system for the washing of vehicles, the system being such that the parts thereof are relatively free from deterioration and wherein the system is such that it lasts for a relatively indefinite period of time.

Still another object of the invention is to provide a versatile vehicle washing system wherein an installation can be easily customized to suit specific needs. For example, it is possible with the system of the invention not only to wash small and medium-sized cars, but also limousines, buses, trucks, recreational vehicles and the like.

In achieving the above and other objects of the invention, there is provided a system wherein a rectangular frame containing a multitude of jets is selectively lowered to spray wash vehicles with a combination of biodegradable chemicals and water. The system is so arranged as to be suspended from above. Thereby when the rectangular frame is raised the floor space which is freed can be used for any other purpose.

In a more general way, there is provided in accordance with the invention a vehicle washing apparatus which comprises a fixed suspension means, frame means adapted for encircling the vehicle to be washed, coupling means coupling the frame means to the suspension means and adapted to lower and raise said frame means with respect to said suspension means and with respect to said vehicle, and cleaning means to eject cleaning fluid from the frame means against the vehicle.

The aforesaid coupling means preferably includes a piston and cylinder arrangement and lines coupling the piston and cylinder arrangement to the frame means. The piston and cylinder arrangement plays out and withdraws the aforesaid lines to raise and lower the frame means. The frame means preferably is constituted by an open frame and there is employed a plurality of pulleys guiding the lines to the open frame, the lines being connected to the latter.

In a specific embodiment of the invention, a yoke is coupled to the piston, the aforesaid lines being coupled between the yoke and the open frame mentioned hereinabove. The piston and cylinder arrangement is preferably arranged in horizontal posture, some of the pulleys having vertical axes and other of the pulleys having horizontal axes whereby to guide the lines in horizontal and vertical directions. The pulleys are moreover spaced to guide the lines to spaced positions on the open frame which is of generally elongated shape and which is preferably rectangular.

As will be seen hereinbelow, the frame is provided with an inwardly directed horizontal channel and the cleaning means includes nozzles located in this channel directed inwardly of the frame. The cleaning means moreover includes sources of water and cleaning agent respectively and pumps connecting the sources to the aforesaid nozzles.

A source of compressed air is provided in the preferred embodiment of the invention and control means couple the source of compressed air to the piston and cylinder arrangement to operate the same. The aforesaid lines are in a preferred arrangement parts of a single continuous main line.

As will also be seen below, the fixed suspension means includes spaced U-shaped members or frames and a horizontal frame carried by the U-shaped members. The aforesaid piston and cylinder arrangement as well as the pulleys are carried by the horizontal frame.

A feature of the invention involves the provision of a timer coupled to the aforesaid pumps for controlling at least one of the same.

The above and other features, advantages and objects of the inventions will be found in the Detailed Description which follows hereinbelow as illustrated in the accompanying drawing.

BRIEF DESCRIPTION OF DRAWING

In the drawing:

FIG. 3 is a diagrammatic view illustrating the operation of a piston and cylinder arrangement employed in the apparatus of FIGS. 1 and 2;

FIG. 4 is a side view of a control apparatus, partially broken away and partially in section, the control apparatus controlling the supply of water and a cleaning agent to the apparatus of FIGS. 1 and 2; and FIG. 5 is a fragmentary view of portion of a frame employed in FIGS. 1 and 2 to illustrate the mounting of nozzles employed for the purpose of spraying vehicles to be washed.

DETAILED DESCRIPTION

Figure 1:
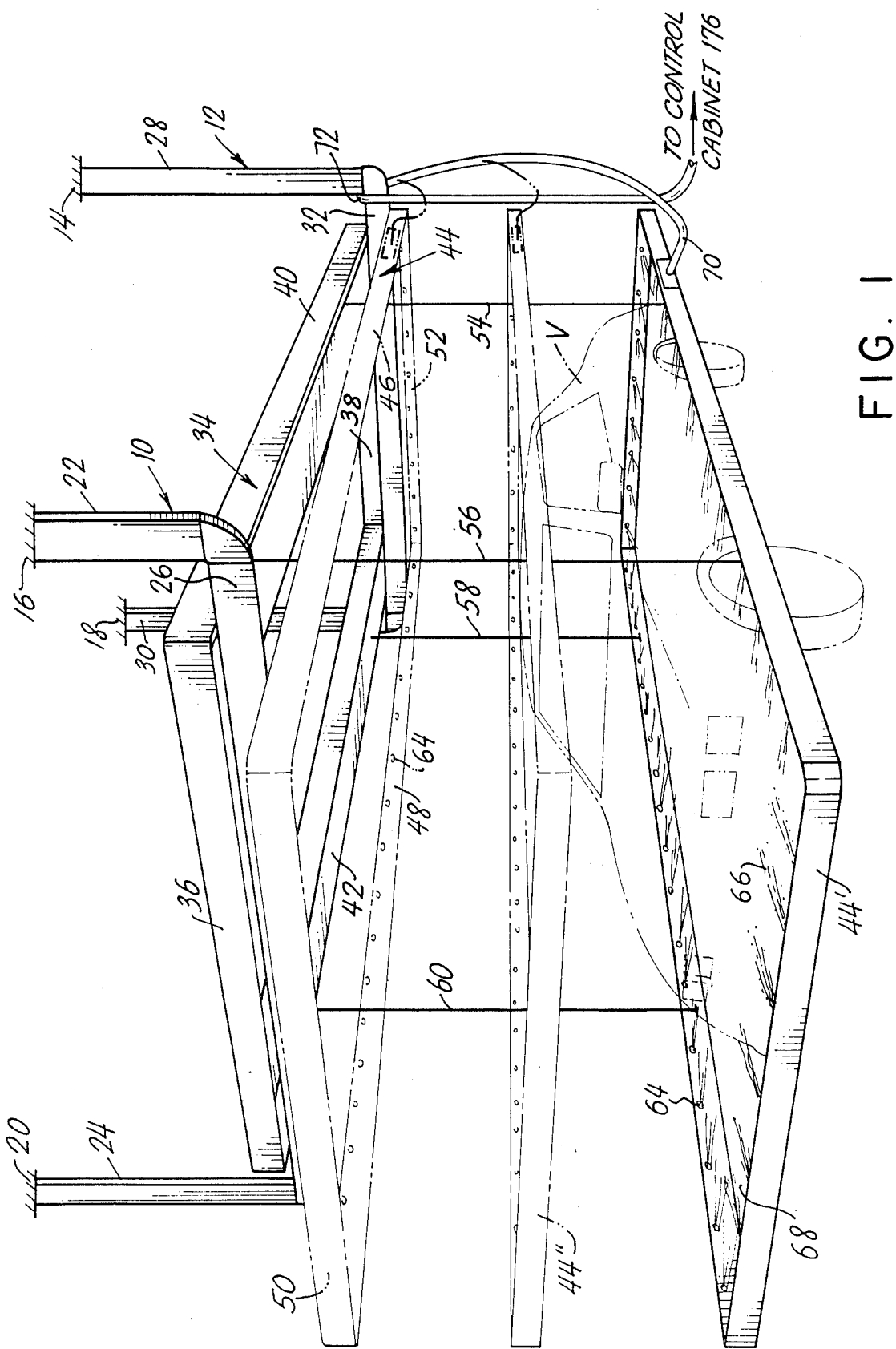
FIG. 1 is a perspective view of a vehicle washing apparatus provided in accordance with the invention, a vehicle to be washed being illustrated in phantom lines.

The vehicle washing apparatus of the invention is shown in FIG. 1 as comprising two U-shaped members or frames 10 and 12 respectively suspended from a ceiling, portions of which are indicated at 14, 16, 18 and 20. The U-shaped member 10 comprises vertical posts 22 and 24 connected by an intermediate bight portion 26. The U-shaped member 12 includes vertical posts 28 and 30 connected by intermediate bight portion 32.

Suspended from the ceiling is a rectangular frame 34 including end sections 36 and 38 and side sections 40 and 42. Frame 34 rests upon the bight portions 26 and 32 of U-shaped members 10 and 12.

The apparatus of the invention furthermore includes a carwashing frame 44. Both the frame 44 and the frame 34 are of corresponding rectangular configuration and both are maintained in at least substantially horizontal posture. The frame 44 includes sides 46 and 48 as well as ends 50 and 52. The vehicle washing frame 44 is shown in raised attitude. Its lowered position is shown at 44' and an intermediate position is illustrated at 44".

In order to control the raising and lowering of frame 44 with respect to vehicle V which is to be washed, there are connected to the frame 44 a plurality of lines or cables 54, 56, 58 and 60. These cables can be fabricated of wire or rope or the like as long as they are sufficiently strong to support the frame 44 and sufficiently flexible to be guided by a guiding system to be described hereinafter. The lines 54, 56, 58 and 60 are connected to rectangular frame 44 at spaced positions which are preferably located on the side sections 46 and 48 in order to hold the frame 44 in stabilized position.

As will be described hereinbelow, the frame 44 is provided at its interior with a plurality of nozzles 64 which direct jets or plumes 66 of fluid and cleaning agent inwardly towards the interior space 68 in which the Vehicle is located. These jets or plumes are directed against the vehicle and as the frame 44 is being raised and lowered, enables a cleaning of the Vehicle by the force and action of the water and cleaning agent being directed thereagainst.

To the frame 44 is connected a conduit or pair of conduits 70 which are looped over the bight 32 as shown at 72. This conduit or pair of conduits is coupled to a control cabinet which is to be discussed in greater detail hereinbelow.

Figure 2:
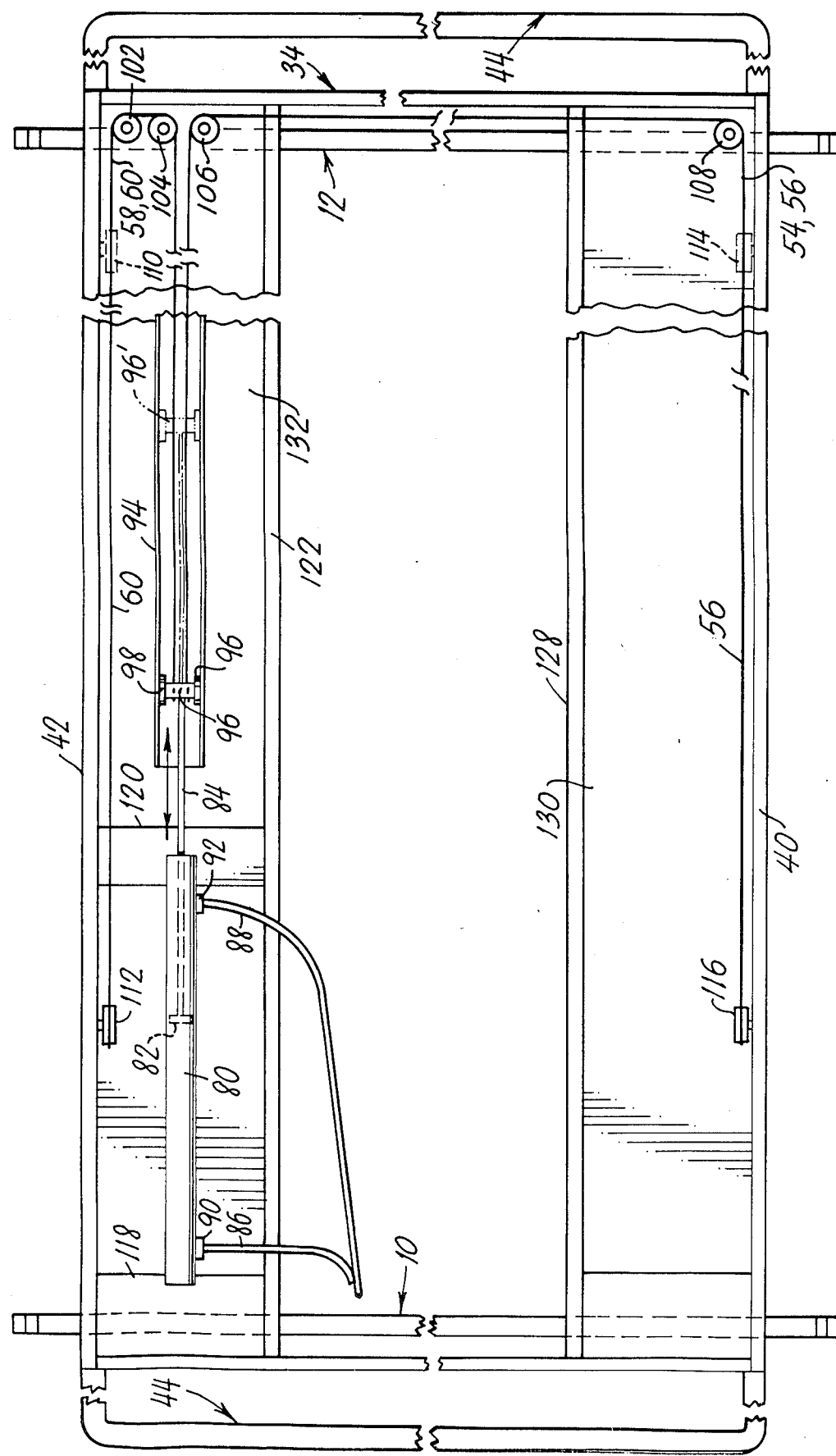
FIG. 2 is a top view of an overhead and suspended frame employed in the apparatus of FIG. 1, the frame housing a piston and cylinder arrangement for controlling lines which suspend a vehicle washing frame.

In FIG. 2 are illustrated a cylinder 80, a piston 82 and a piston rod 84. These elements are all in horizontal attitude. The piston 82 is accommodated within the cylinder 80 and is displaced by compressed air supplied by lines 86 and 88 connected at opposite ends of the cylinder 80 by means of fixtures 90 and 92. Compressed air is fed to lines 86 and 88 by an arrangement to be discussed hereinbelow.

Mounted in extension of the cylinder 80 is a U-shaped channel 94 within which is accommodated a yoke 96. The yoke 96 is connected to the free-end of piston rod 84. Wheels 98 and 100 are connected to opposite ends of the yoke 96 and are received in the U-shaped channel 94 to facilitate movement of the yoke therealong to a displaced position such as, for example, shown at 96'.

A plurality of lines are coupled to the yoke 96. As will be shown hereinafter, these lines are all parts of a single main line. The lines have been referred to hereinabove as lines 54, 56, 58 and 60. They are attached to various positions on the carwashing frame 44 whose raised or lowered position or positions are controlled by the playing out and retrieving of the various lines which in turn is controlled by the position of the yoke 96 under the control of the piston and cylinder arrangement 80, 82.

The lines are guided by a guiding system consisting of a plurality of pulleys or rollers preferably fabricated of Teflon or some other suitable plastic adapted for constituting a relatively noise-free and effective guiding system. The system includes more particularly pulleys or rollers 102, 104, 106 and 108 having vertical axes and adapted for providing for a change of direction of the respective lines and a lateral displacement of the same in a horizontal plane. In addition, there are provided a further group of pulleys indicated at 110, 112, 114 and 116 having horizontal axes and intended for providing a change in direction of the respective lines such that these lines move from a horizontal attitude to a vertical attitude, thereby to suspend the carwashing frame 44.

It will be further noted in FIG. 2 that the frame 34 is provided with supports 118 and 120 mounted between side 42 and an interior element 122 stretching longitudinally along the frame 44. Supports 118 and 120 provide a mounting for the cylinder 80 and firmly hold the same in position. Operation of compressed air in the cylinder 80 displaces piston 82, thereby controlling the playing out of the various lines and the retrieving of the same. The weight of the frame 44 is adequate to hold the various lines fully extended or taut so that no entanglement of these lines can occur.

Also appearing in FIG. 2 is the longitudinally disposed member 128. Supported between this member and the side 40 of frame 34 is the sheet member 130. Similarly, a sheet member 132 is supported between side 42 and longitudinally disposed member 122. It is in these sheet members that openings are provided for the lines passing around the various pulleys as next explained with reference to FIG. 3.

In FIG. 3 are illustrated the above-mentioned pulleys 102, 104, 106, 108 as well as pulleys 110, 112, 114, and 116. These pulleys are disposed in openings 134, 136, 138 and 140 provided in the above-mentioned sheet members 130 and 132 (see FIG. 2).

Also seen in FIG. 3 are the attaching members 142, 144, 146 and 148 by means of which the free ends of the various lines 58, 60, 54 and 56 are attached to positions on the carwashing frame 44.

FIG. 3 illustrates that, as aforesaid, the lines 54, 56, 58, and 60 are guided from horizontal to vertical attitudes. FIG. 3 moreover illustrates that these lines can be part of a single main line, the line 54 being connected to line 56 by means of bight 150 and the line 58 being connected to line 60 by bright 152. Thus, the lines are connected to the yoke 56 through which they extend in monolithic relationship with one another with the bights 150 and 152 holding the line sections attached to the yoke 96, the movement of which is indicated by double-headed arrow 154, this being controlled by operation of the piston and cylinder arrangement through the intermediary of piston rod 84 as has been discussed hereinabove.

The cleaning system of the invention includes a tank 160 for storing and dispensing water and a tank 162 for storing and dispensing a cleaning agent such as liquid soap or the like. Tank 160 is connected via conduit 164 to water pump 166. Tank 162 is connected via conduit 168 to a liquid soap pump 170. A valve 172 with a control handle 174 is provided in conduit 164.

The bulk of the controls of the invention are contained in control cabinet 176 from which extend lines 86 and 88, as aforesaid, to the cylinder 80 (see FIG. 2). These compressed air lines 86 and 88 are attached to an air valve 177, in turn connected to a regular 178, in turn coupled via a line 180 to a source of compressed air (not shown).

Conduit 70 for supplying water and cleaning agent to the frame 44 are shown in FIG. 4 as consisting of respective lines 182 and 184. These lines carry water and fluid cleaning agent respectively to the frame 44, whereat they are dispensed through nozzles 64 in jets or plumes directed against the vehicle to be washed.

The apparatus of the invention moreover comprises a timer 190 housed within the control cabinet and connected via a line 192 to the pump 166 to control operation of the same. Operation of the pump 166 simultaneously controls operation of the soap pump 170. Power is supplied to the timer and the pumps by means of electrical lines 194 and 196 connected to a source of electrical power by a plug 198 of conventional type.

FIG. 5 illustrates a section of frame 44 defining therein a channel 200 within which is accommodated nozzles 64. The nozzles 64 are of such a length as to be accommodated within the depth of the channel 200 to be protected thereby. The frame 44 moreover defines a housing 202 within which pass the lines coupling the lines 182 and 184 to the nozzles 64 for the directing of water and cleaning agent against the vehicle V.

The relatively large horse power pump 166 integrates with the soap pump 170 dispensing chemical cleaners automatically into the system. The frames which have been mentioned hereinabove are preferably formed of anodized aluminium material which is extra strong and will not rust. The nozzles 64 mentioned hereinabove are brass nozzles of a design to provide increased water flow and stronger spray patterns then heretofore available. The Teflon rollers mentioned hereinabove are relatively noise-free and provide for lowering the car-washing frame 44 quietly and smoothly.

Also possibly provided as an optional feature of the invention is a high pressure water gun which is fed directly from the main water pump. It enables an operator to clean the undercarriage of vehicles to be cleaned including the wheel wells. It may be employed in order to prevent the freeze up of door jambs and locks under relatively cold conditions. The water storage tank is preferably provided with a capacity in the order of magnitude of 180 gallons which provides for extended usage without drawing and thereby lowering water pressure in the associated building. Automatic control for chemical flow can be provided by an electronic computer (not shown) standardizing functions to prevent waste. An internal counter (not shown) can provide an accurate check of the number of vehicles processed daily.

An automatic system may be provided in accordance with the invention so that as soon as the frame 44 reaches hub cap level with respect to the vehicle V, the chemical pump begins to operate. An adjustment can be provided to compensate for regions of hard or soft water. Once the chemical pump is activated, the frame rises, spraying water and preferably biodegradable chemical cleanser over the entire vehicle.

There will now be obvious to those skilled in the art, many modifications and variations of the apparatus set forth hereinabove. These modifications and variations will not depart from the scope of the invention if defined by the following claims:

What is claimed is:

1. Vehicle washing apparatus comprising fixed suspension means, frame means adapted for encircling said vehicle, coupling means coupling said frame means to said suspension means and adapted to lower and raise said frame means with respect to said suspension means and with respect to said vehicle, and cleaning means to eject cleaning fluid from said frame means against said vehicle, said coupling means including a piston and cylinder means and lines coupling the piston and cylinder means to the frame means, said piston and cylinder means playing out and withdrawing said lines to raise and lower the frame means, said frame means including an open frame and comprising pulleys guiding said lines to said frame, said lines being connected to said frame, said apparatus further comprising a yoke coupled to said piston, said lines being coupled between said yoke and said frame, said piston and cylinder means being generally in horizontal posture, and pulleys including first, second, third, fourth, fifth and sixth pulleys, said first and second pulleys having vertical axes and each receiving two of said lines from said yoke and providing a change of direction for said lines in a horizontal plane, said third, fourth, fifth and sixth pulleys having horizontal axes receiving said lines from said first and second pulleys and guiding said lines to a vertical direction and to said frame, said pulleys further including seventh and eighth pulleys being linearly aligned with said first and second pulleys and having vertical axes and guiding said lines from said first and second pulleys to said third, fourth, fifth and sixth pulleys and being substantially in rectilinear alignment with the third, fourth, fifth and sixth pulleys, the alignment of the first, second, seventh and eighth pulleys being transverse to the alignments of the third, fourth, fifth and sixth pulleys.

2. Vehicle washing apparatus as claimed in claim 1 wherein said frame is elongated and rectangular and the pulleys are spaced to guide the lines to four spaced positions on the frame.

3. Vehicle washing apparatus as claimed in claim 2 wherein the frame is provided with an inwardly directed horizontal channel and said cleaning means includes nozzles in and protected by said channel and being directed inwardly of the frame.

4. Vehicle washing apparatus as claimed in claim 3 wherein said cleaning means includes a source of water, a source of cleaning agent, and a pump means coupling said sources to said nozzles.

5. Vehicle washing apparatus as claimed in claim 4 comprising a source of compressed air and control means coupling said source of compressed air to said piston and cylinder means to operate the same.

6. Vehicle washing apparatus as claimed in claim 5 comprising a timer means coupled to said pump means for controlling the same.

7. Vehicle washing apparatus as claimed in claim 5 wherein said pump means includes separate pumps coupled to said source of water and source of cleaning agent.

8. Vehicle washing apparatus as claimed in claim 3 wherein the channel has a depth at least substantially equal to the nozzles whereby the nozzles are concealed in the channel.

9. Vehicle washing apparatus as claimed in claim 1 wherein said lines are parts of a single continuous main line which passes through said yoke.

10. Vehicle washing apparatus as claimed in claim 1 wherein said fixed suspension means includes spaced U-shaped members and a horizontal frame carried by said U-shaped members, said piston and cylinder means and pulleys being carried by said horizontal frame.

11. Vehicle washing apparatus as claimed in claim 1 wherein the pulleys are Teflon rollers.

12. Vehicle washing apparatus as claimed in claim 1 comprising a U-shaped channel to receive and guide said yoke, said yoke including wheels resting within said channel to facilitate movement therealong.

* * * * *